(No Model.)
D. W. MAGEE.
PIPE COUPLING.
No. 379,798. Patented Mar. 20, 1888.
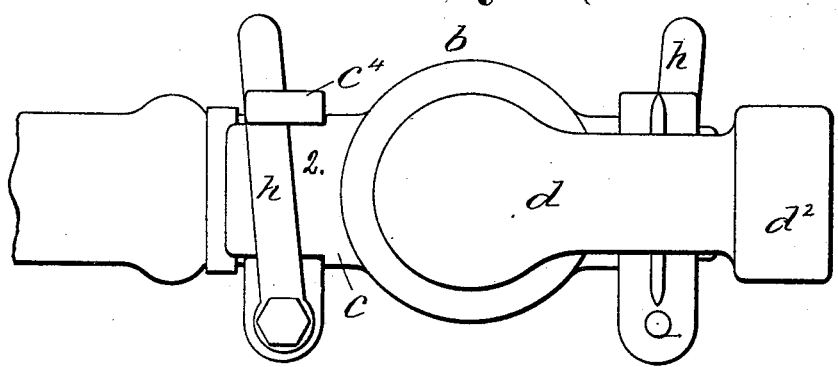
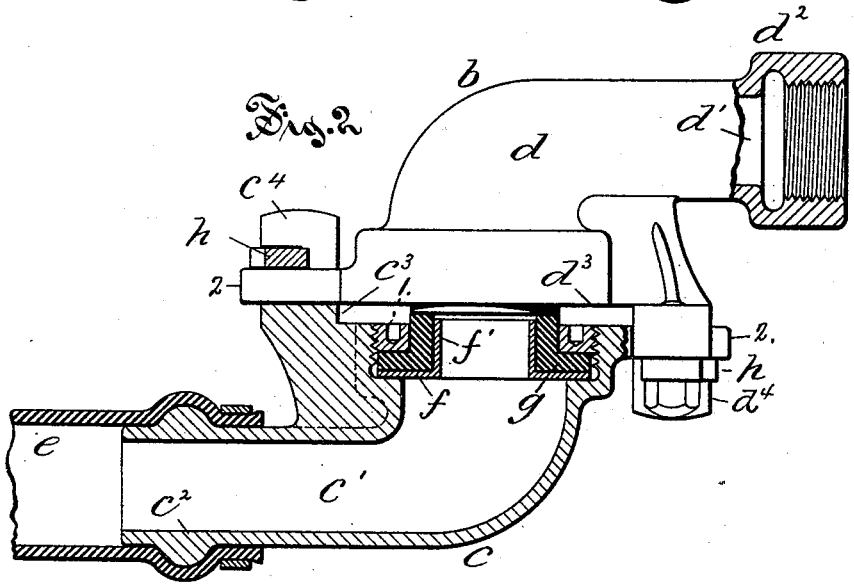
WITNESSES:
W. M. Bjorkman
H. R. Williams
INVENTOR
Daniel W. Magee
By Simonds & Burdett
BY ATTYS.

UNITED STATES PATENT OFFICE.

DANIEL W. MAGEE, OF NEW YORK, N. Y.

PIPE-COUPLING.

SPECIFICATION forming part of Letters Patent No. 379,798, dated March 20, 1888.

Application filed March 22, 1887. Serial No. 232,000½. (No model.)

*To all whom it may concern:*

Be it known that I, DANIEL W. MAGEE, of the city, county, and State of New York, have invented certain new and useful Improvements in Pipe-Couplings, of which the following is a full, clear, and exact description, whereby any one skilled in the art can make and use the same.

My invention relates to the class of couplings that are adapted for use in systems of pipes for conveying fluids, as air, steam, or water; and my object is to provide a coupling that is particularly adapted for use on the pipes used for conveying air, steam, or the like in the heating or brake systems of a railway-train, but more especially the former, my said improved coupling being adapted for use on a system of rigid or flexible pipes, and being so made as to form a tight joint while coupled, but uncouple under a sufficient strain or pull upon the connected pipes.

My invention consists in a coupling composed of the similar body parts having meeting faces or bearings, in combination with the locking device, as within described, and the packing-thimbles, with which each body part is provided, and which operate under the pressure of the fluid conveyed in the pipe.

It further consists in a coupling composed of two parts detachably connected, whereby a pull upon the opposite parts in directions substantially parallel to the meeting faces of the parts serves to uncouple the device; and it further consists in details of the several parts and their combination, as more particularly hereinafter described, and pointed out in the claims.

Referring to the drawings, Figure 1 is a side view of my improved coupling, shown in connection with the pipes of a steam-heating system for railway-cars. Fig. 2 is a top or plan view of the same, wherein one section of the pipe-coupling is shown in central longitudinal section, showing the arrangement of the thimble and packing.

In the accompanying drawings, the letter $e$ denotes a tube adapted to convey a fluid, as steam, air, or water; $b$, the coupling as a whole; $c$ and $d$, the body parts of the coupling, that are similar in construction, and preferably cast to shape from any convenient metal, as brass or iron, each body part having a through-way, $c'$ $d'$, and a neck, $c^2$, that may be adapted to be connected to the end of a flexible tube or base, $e$, or a neck, $d^2$, that may be threaded to receive the threaded end of a rigid pipe.

The way through each body part is angular, so that the exit is in a plane at about right angles to the inlet, and adjacent to this the bearing-faces $c^3$ $d^3$ are formed in such manner that when the body parts are fitted together the opening through the whole coupling is continuous, as clearly seen in the sectional view.

Within the opening, adjacent to the bearing-faces of each body part, is located a thimble, $f$, or flanged ring, that fits snugly within the opening, but has a passage through it less in diameter than the diameter of the opening, the flanges $f'$ turning toward each other and being surrounded by an annular packing, $g$, that may be of any convenient material, but preferably of fibrous asbestus, or the like elastic wear and heat resisting material.

Each body part bears a projecting lug, $c^4$ $d^4$, and also a swinging latch, $h$, that overlies a projection, 2, on the opposite body part in such manner as to force the two parts firmly together when the latch is engaged under the lug. This holds the two parts together with sufficient force to prevent their accidental uncoupling, and firmly against all strains at right angles to the plane of the meeting surfaces; but when any strain is brought upon the parts in opposite directions and substantially parallel to the said plane—as, for instance, by a lengthwise pull upon the tubes that are coupled by the device—the parts uncouple. This is of advantage in many instances—as, for instance, in connection with the pipe system of automatic brakes such an uncoupling will at once put on the brakes. The thimbles are pressed toward each other by the pressure of the steam and aid in firmly packing the joint, the contracted way through the thimbles leaving an annular shoulder upon which the steam exerts its force in a direction at right angles to the joint. These bushings or thimbles serve a further purpose in so covering the annular packing as to prevent its wearing away by the erosive action of steam or other fluid flowing through the coupling.

The annular packing $g$ may be held in position in its socket by means of a ring, 1, that is threaded and fitted within a threaded socket on the meeting face.

I do not limit myself to the precise construction of parts hereinbefore recited, as I contemplate the use of other forms of body parts, and of means for detachably connecting them, that are modifications and do not depart from my invention as herein described.

I claim as my invention—

1. In a pipe-coupling, the combination of coupling-sections constructed to draw apart on a plane parallel with their meeting faces, and formed with oppositely-arranged projections 2 and oppositely-arranged overhanging lugs $c^4$ and $d^4$, and latch-bars $h$, pivoted on opposite coupling-sections and arranged to set across the projections of the coupling-sections and engage under the opposite overhanging lug, to hold the coupling-sections against separation except in a direct line parallel with the plane of their meeting faces, substantially as described.

2. The combination, in a pipe-coupling composed of two similar half-couplings, of the metallic thimbles $f$, formed with an annular pipe-flange, $f'$, of less diameter than the necks of the couplings, the annular packing $g$, seated in the annular pipe-flange $f$, overhanging lugs on opposite coupling-sections, and pivoted latch-bars arranged to set across the ends of the opposite coupling-sections, to engage the overhanging lugs and hold the faces of the couplings and packings in contact, substantially as described.

DANIEL W. MAGEE.

Witnesses:
H. R. WILLIAMS,
CHAS. L. BURDETT.